United States Patent [19]
de Ruiter et al.

[11] Patent Number: 5,807,424
[45] Date of Patent: *Sep. 15, 1998

[54] REGENERATIVE ADSORPTION FILTER BED FOR EXHAUSTER HOODS

[75] Inventors: Ernest de Ruiter, Höhenstrasse 57a, D-51381 Leverkusen; Jonas Törnblom, Erkrath, both of Germany

[73] Assignees: Hasso von Blücher, Erkrath; Ernest de Ruiter, Leverkusen, both of Germany

[*] Notice: The term of this patent shall not extend beyond the expiration date of Pat. No. 5,616,169.

[21] Appl. No.: 491,674

[22] Filed: Jun. 19, 1995

[30] Foreign Application Priority Data

Jun. 17, 1994 [DE] Germany .......... 44 21 195.3

[51] Int. Cl.$^6$ .................. B01D 53/02
[52] U.S. Cl. ............. 95/148; 55/242; 55/486; 55/524; 55/DIG. 13; 55/DIG. 42; 95/281; 95/285; 95/287; 96/130; 96/153; 96/154
[58] Field of Search ............. 95/148, 285, 286, 95/287, 281, 273; 96/156, 154, 130, 143; 55/486, 487, 524, 242, DIG. 42, DIG. 13

[56] References Cited

U.S. PATENT DOCUMENTS

| | | | |
|---|---|---|---|
| 3,381,454 | 5/1968 | Sponsel | 55/524 |
| 3,519,708 | 7/1970 | Mcmichael | 55/524 |
| 3,687,297 | 8/1972 | Kuhn et al. | 96/153 |
| 3,865,758 | 2/1975 | Yoshida et al. | 55/DIG. 13 |
| 3,925,248 | 12/1975 | Moroni et al. | 96/153 |
| 4,040,990 | 8/1977 | Neely | 521/29 |
| 4,178,161 | 12/1979 | Rudner et al. | 55/524 |
| 4,224,415 | 9/1980 | Meitzner et al. | 521/38 |
| 4,296,166 | 10/1981 | Ogino | 55/524 |
| 4,411,948 | 10/1983 | Ogino et al. | 55/524 |
| 4,504,290 | 3/1985 | Pontius | 55/524 |
| 4,510,193 | 4/1985 | Blucher et al. | 96/154 |
| 4,689,058 | 8/1987 | Vogt et al. | 55/524 |
| 4,699,681 | 10/1987 | Kasmarck, Jr. et al. | 96/154 |
| 4,758,460 | 7/1988 | Spicer et al. | 55/524 |
| 4,955,995 | 9/1990 | Pontius | 55/524 |
| 4,957,897 | 9/1990 | Maroldo et al. | 502/432 |
| 4,981,501 | 1/1991 | Von Blucher et al. | 55/DIG. 13 |
| 4,983,192 | 1/1991 | Von Blucher et al. | 55/524 |
| 5,129,929 | 7/1992 | Linnersten | 55/524 |
| 5,226,937 | 7/1993 | Linnersten et al. | 55/DIG. 42 |
| 5,350,443 | 9/1994 | Von Blucher et al. | 96/154 |
| 5,395,428 | 3/1995 | Von Blucher et al. | 96/154 |
| 5,609,761 | 3/1997 | Franz | 55/524 |
| 5,616,169 | 4/1997 | De Ruiter et al. | 55/DIG. 42 |

FOREIGN PATENT DOCUMENTS

| | | | |
|---|---|---|---|
| 63 768 | 9/1968 | Germany . | |
| 2804154 | 1/1979 | Germany | 55/524 |
| 51-11085 | 7/1976 | Japan | 96/154 |
| 55-99319 | 7/1980 | Japan | 96/154 |
| 61-103518 | 5/1986 | Japan | 55/524 |
| 51-138511 | 6/1986 | Japan | 55/524 |
| 597895 | 4/1978 | Switzerland | 55/DIG. 13 |
| 2 012 257 | 7/1979 | United Kingdom . | |
| 1 525 420 | 9/1979 | United Kingdom . | |
| 2 025 385 | 1/1980 | United Kingdom . | |
| 2032298 | 5/1980 | United Kingdom | 96/154 |
| 2 053 176 | 2/1981 | United Kingdom . | |

*Primary Examiner*—Duane S. Smith
*Attorney, Agent, or Firm*—Cohen, Pontani, Lieberman & Pavane

[57] ABSTRACT

An odor filter for exhauster hoods, which filter includes an adsorption filter bed regenerable by washing. The filter bed is made of a highly air-permeable substrate material and an adsorbent affixed thereto in the amount of 50 to 400 g/l by an adhesive mass and has a mean particle diameter between 0.2 and 2 mm.

41 Claims, 1 Drawing Sheet

REGENERATIVE ADSORPTION FILTER BED FOR EXHAUSTER HOODS

BACKGROUND OF THE INVENTION

1. Field of the Invention

The invention relates to a regenerative adsorption filter bed, and more particularly to a regenerative adsorption filter bed for use in exhauster hoods.

2. Description of the Prior Art

Exhauster hoods are widely used to purify fumes laden with odor-intensive substances, especially greasy substances, which are produced, in particular, during cooking. After filtration, the purified air can be returned to the cooking area (recirculation filter) or blown out of the building into the outside air (exhaust filter).

All exhauster hoods have grease filters that separate out the easily combustible fats, in order to reduce the danger of fire. Exhauster hoods that return the air to the kitchen and exhauster hoods in larger kitchens (hotels or restaurants) that carry air away to the outside must also have odor filters, in order to protect the immediate premises as well as neighboring buildings against annoying odors.

The adsorbent most often used in odor filters of this type is activated charcoal, which is usually present in the form of a coating on porous mats. To create these filters, a highly air-permeable material, such as a fleece or a thin plastic foam, is first sprayed or soaked with an activated charcoal that has been mixed with a binding agent dispersion and ground with water slurry, and is then squeezed out. However, these filters have only a short useful life, because their adsorption capacity is low, due to the small amount of activated charcoal used and the partial clogging of its pores by the binding agent.

In another known form, the odor filter consists of a loose packing of activated charcoal. Although the adsorption capacity is improved in these filters, the adsorption kinetics deteriorate, due to the larger activated charcoal particles, and the filter causes a high pressure loss.

The performance of these filters is improved through the use of filters based on the "expanded fixed bed" principle. According to this principle, small adsorbent particles (activated charcoal granules or pellets having a particle size of 0.3 to 1 mm) are affixed to an open substrate structure (large-pored reticulated plastic foam), which is usually shaped like a flat sheet. Compared to the filters mentioned above, filter materials of this type, which are available as sheets having a thickness of up to 30 mm, have significantly lower pressure loss and, thanks to an activated charcoal quantity of approximately 200 g/l, increased capacity and performance. Their useful life also increases. It remains limited, however, not only by saturation with odorous substances, but also by blocking of the adsorbent transport pores through fats not eliminated by the grease filter. Despite the aforementioned advantages, these filters are not in widespread use, because the cost of procuring them is too high relative to their effective useful life.

SUMMARY AND DESCRIPTION OF THE INVENTION

Accordingly, it is an object of the present invention to provide a filter for exhauster hoods which, along with high adsorption capacity and kinetics, also has a long effective useful life.

Pursuant to this object, and others which will become apparent hereafter, one aspect of the present invention resides in an odor filter for exhauster hoods, comprised of an adsorption filter bed regenerable by washing, made of a highly air-permeable substrate material and an adsorbent material affixed thereto in the amount of 50 to 400 g/l by means of an adhesive mass and having a mean particle diameter between 0.2 and 2 mm.

The adsorption filter bed used according to the invention for exhauster hoods is regenerated by washing. This is preferably accomplished by a washing operation that may be carried out in any known manual or mechanized manner. Preferably, the filter is washed in a commercially available dish washing machine. In this way, unwanted substances which still adhere to the filter material or cover or clog its pores, as well as substances adsorbed in the pores, are removed. These unwanted substances are usually fats or dust particles. The substances, for the most part, are completely removed in the washing process, while the adsorbent characteristics of the active material in the filter bed are maintained without loss. The actual washing process may also be followed by one or more rinsing steps. Regeneration can be carried out more than once, preferably more than fifty times, without any significant loss being detected in adsorption capacity and/or adsorption kinetics.

DESCRIPTION OF THE PREFERRED EMBODIMENTS

According to a preferred embodiment of the invention, the adsorption filter bed is shaped like a flat sheet 5 having a layer thickness of 6 to 40 mm, preferably 10 to 30 mm. Furthermore, a filter may consist of a plurality of these adsorption filter beds.

In a further embodiment, the flat adsorption filter bed has elongated indentations (e.g., in a V-shape). This layer is then placed in the interior of cylindrical holders in such a way that the edges of the indentations, each of which is arranged in the axial direction, touch one another. This prevents the adsorbent particles from becoming compressed in the inner area of the filter bed; otherwise, densification would lead to increased air resistance. Such filter elements are used, in particular, in exhauster hoods in large-scale kitchens.

In a particular embodiment according to the invention, the highly air-permeable substrate material is an open-pored plastic foam. This open-pored plastic foam may be an open-pored reticulated polyurethane foam, preferably an open-pored reticulated polyurethane foam having a liter weight of 20 to 60 g and a pore size of 1.5 to 3 mm. The foam may have a porosity of 8 to 30 ppi.

In a further embodiment of the present invention, the adsorption filter bed is arranged in the exhauster hood, through slight compression, in a seal-free and frame-free fashion. For this purpose, the foam loaded with the adsorbent should have a compressibility of at least 2% under a pressure of 1 to 10 $N/cm^2$.

Figure 1:
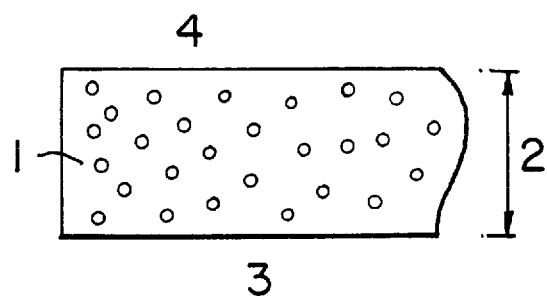
FIG. 1 is a partial schematic cross-sectional view of the inventive odor filter.
Figure 2:
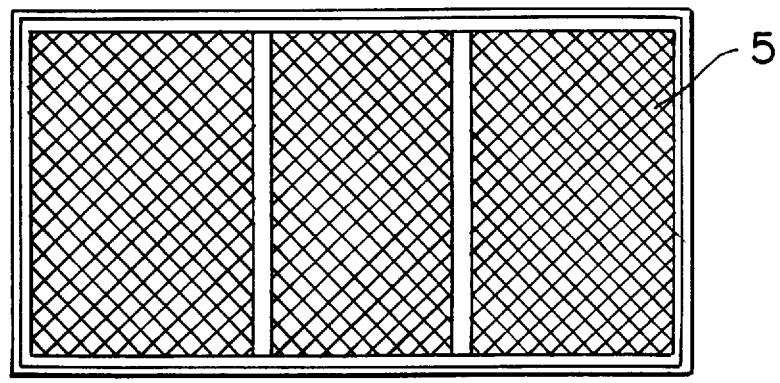
FIG. 2 is a plan view of the filter.

As shown in FIG. 1, the filter bed 1 has a thickness 2, an inlet side 3 and an outlet side 4.

The following may be used as the adsorbent:

Activated charcoal (carbonized and then activated material originating from vegetable raw materials—wood, peat, hard coal, etc.), Spherical activated charcoal from coal-tar pitch or petroleum residues having a diameter of 0.2 to 2 mm, preferably 0.3 to 1 mm, and/or an inner surface (determined using the BET method) of at least 900 $m^2/g$ (such spherical activated charcoal is described, for example, in GB-B-1 525 420, GB-B-2 012 257, GB-A 2 025 385 and GB-A-2 053 176), Splint or granular coal having a particle size of 0.2 to 2 mm, preferably 0.3 to 1.0 mm, and an inner surface of at least 900 $m^2/g$ (such coal is described, for example, in "Activated Charcoal and its Industrial Application" ["Aktivkohle und ihre industrielle Anwendung"] by H. von Kienle, E. Baeder, Ferdinand Enke Verlag, Stuttgart, 1980), Carbonized and activated porous polymers based on sulfonated styrene-divinyl-benzol copolymers or styrene-acrylic acid copolymers (such carbonized polymers are described, for example, in U.S. Pat. No. 4,040,990, U.S. Pat. No. 4,224,415 and U.S. Pat. No. 4,957,897), Carbonized and activated ion exchangers based on sulfonated styrene-divinyl-benzol copolymers or styrene-acrylic acid copolymers (the manufacture of activated charcoal from ion exchangers of this type is described, for example, in DD-B-063 768 and DE-A-43 04 026) or carbonized and activated anion exchangers based on polystyrene resins or polyacrylic resins having tertiary or quaternary amino groups, particularly ion exchangers of the gel type (such ion exchangers are described, for example, in DE-A-43 28 219), Porous (non-carbonized) polymers based on a copolymer of styrene and divinyl benzol cross-linked via $CH_2$ bridges (as sold by the Dow Chemical Corp, for example, under the tradename Sorbathene®), Form particles of molecular sieves, preferably hydrophobic molecular sieves having an $SiO_2/Al_2O_3$ module of >10 (as sold by Degussa AG, for example, under the name DAY-Zeolith).

The application of spherical charcoal to an air-permeable substrate material is described, for example, in DE-A-33 04 349 and EP-B 118 618.

The adsorbent may be worked into the PU foam according to DE-A-38 13 563, for example.

The use of spherical charcoal leads to an increased useful life and/or adsorption capacity, compared to activated charcoal.

In addition, practically no abrasion occurs during the regeneration process when spherical charcoal is used, due to its hard surface. Even under rough washing conditions, no material loss—and thus none of the loss in adsorption capacity and kinetics associated with material loss—is observed.

According to a preferred embodiment of the invention, the following is used as the adsorbent: acid-impregnated activated charcoal, spherical activated charcoal, splint or granular coal or acid-impregnated activated charcoal from carbonized and activated cation exchangers, anion exchangers or porous polymers. Impregnation is carried out, for example, using phosphoric acids for the adsorption of ammonia and amines. By using adsorbent materials of this type, it is possible to effectively neutralize unpleasant fish odors, in particular.

When the filter bed used according to the invention consists of a plurality of adsorption filter beds placed one atop the other, these beds may have the same or different characteristics in respect to thickness, adsorbent or adhesive mass, and, in particular, impregnation.

When the adsorption material, especially activated charcoal as described above, is impregnated with acid, it has proved effective to impregnate the regenerated adsorption filter bed again after the washing process or after the final rinse, in order to counteract any possible loss in weight caused by washout. This post-impregnation may also be carried out in the final rinsing bath, for example by using commercially available vinegar. The regenerative ability of the adsorption filter for exhauster hoods leads to a very advantageous cost/benefit relationship.

In a preferred embodiment according to the invention, the adsorption filter bed contains 50 to 400 g/l, preferably 150 to 350 g/l, of adsorbent.

In particular, a particle size of the adsorbent material may be used which is at least three times smaller than the pore diameter of the substrate material.

The adsorbent applied to the air-permeable substrate material may have a mean particle diameter of 0.3 to 1 mm. The adsorbent may also be applied in a quantity between 100 to 300 g/l, relative to the volume of the substrate material.

The quantity of the adhesive mass used in the adsorption filter bed may equal the weight of the highly air-permeable substrate material ±50%. Organic cross-linkable polymers may be used as the adhesive mass, for example: derivatives of acrylic acid, polyurethane, polystyrene, polyisocyanate, polyvinyl acetate, or hot-melt adhesive.

According to another embodiment of the invention, a pre-polymeric low-solvent two-component system based on masked diisocyanates and/or polyisocyanates, which are cross-linked to diamines and/or polyamines, is used as the adhesive mass. This adhesive mass has good initial adherence and displays a marked viscosity minimum during the cross-linking phase, resulting in optimal adherence. This viscosity minimum of the adhesive mass reduces the contact surface between the substrate material and the adsorbent to a minimum, so that the high air permeability of the substrate material is maintained. These systems preferably use the products sold by BAYER AG under the name "IMPRANIL® High Solid PURE Reactive Products."

A further preferred adhesive mass consists of non-masked polymeric diisocyanates and/or polyisocyanates, such as those sold by BAYER AG under the name Levacast Addukt 43131 N, for example. The cross-linking reaction is initiated by the moisture present in the adsorbent.

In a further embodiment according to the invention, a grease filter is arranged before the adsorption filter bed in the direction of flow.

The invention also relates to a process for regenerating an adsorption filter bed for exhauster hoods, wherein the regeneration consists of a washing operation. This regeneration may be carried out by washing in an automatic dishwasher.

The adsorption filter bed containing the impregnated adsorbent may also be impregnated again with an acid after the washing process. The earlier statements in respect to the impregnation and the acid also apply here.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. An odor filter for an exhauster hood, comprising an adsorption filter bed regenerable by washing, said filter bed being made of a highly air permeable substrate material, an adsorbent affixed in an amount of 50 to 400 g/l, and an adhesive mass for affixing the adsorbent to the substrate material, said adsorbent having a mean particle diameter between 0.2 and 2 mm.

2. An odor filter as defined in claim 1, wherein the adsorption filter bed has a plurality of layers.

3. An odor filter as defined in claim 1, wherein the adsorption filter bed has a thickness between 6 and 40 mm.

4. An odor filter as defined in claim 3, wherein the thickness of the adsorption filter bed is between 10 and 30 mm.

5. An odor filter as defined in claim 1, wherein the adsorption filter bed has elongated indentations.

6. An odor filter as defined in claim 1, wherein the highly air-permeable substrate material is an open pore plastic foam.

7. An odor filter as defined in claim 6, wherein the open pore plastic foam is an open-pore reticulated polyurethane foam.

8. An odor filter as defined in claim 7, wherein the open pore plastic foam is an open pore reticulated polyurethane foam having a liter weight of 20 to 50 g and a pore size of 1.5 to 3 mm.

9. An odor filter as defined in claim 6, wherein the open pore plastic foam has a porosity of 8 to 30 ppi.

10. An odor filter as defined in claim 1, wherein the adsorption filter bed is compressible so as to be arrangeable in the exhauster hood by compression in a seal-free and frame-free manner.

11. An odor filter as defined in claim 10, wherein the adsorption filter bed is a plastic foam which has a compressibility of at least 2% under a pressure of 1 to 10 $N/cm^2$.

12. An odor filter as defined in claim 1, wherein the absorbent is activated charcoal.

13. An odor filter as defined in claim 1, wherein the absorbent is spherical activated charcoal having a diameter of 0.2 to 2 mm.

14. An odor filter as defined in claim 13, wherein the spherical activated charcoal has a diameter of 0.3 to 1 mm.

15. An odor filter as defined in claim 13, wherein the spherical activated charcoal has an inner surface area of at least 900 $m^2/g$.

16. An odor filter as defined in claim 1, wherein the absorbent is one of splint and granular coal having a diameter of 0.2 to 2 mm.

17. An odor filter as defined in claim 16, wherein the coal has a diameter of 0.3 to 1 mm.

18. An odor filter as defined in claim 16, wherein the coal has an inner surface area of at least 900 $m^2/g$.

19. An odor filter as defined in claim 1, wherein the absorbent is a carbonized and activated porous polymer based on one of sulfonated styrene-divinyl-benzol copolymers and sulfonated styrene-acrylic acid copolymers.

20. An odor filter as defined in claim 1, wherein the absorbent is a carbonized and activated cation exchanger based on one of sulfonated styrene-divinyl-benzol copolymers and sulfonated styrene-acrylic acid copolymers.

21. An odor filter as defined in claim 1, wherein the absorbent is a carbonized and activated anion exchanger based on one of polystyrene resins and polyacrylic resins having one of tertiary and quaternary amino groups.

22. An odor filter as defined in claim 1, and further comprising an acidic impregnation agent impregnated in the absorbent.

23. An odor filter as defined in claim 22, wherein the impregnation agent is phosphoric acid.

24. An odor filter as defined in claim 1, wherein the absorbent consists of porous polymers based on a copolymer of styrene and divinyl benzol cross-linked with $CH_2$ bridges.

25. An odor filter as defined in claim 1, wherein the absorbent is formed of form particles of hydrophobic molecular sieves.

26. An odor filter as defined in claim 1, wherein 150 to 350 g/l of the absorbent is contained in the adsorption filter bed.

27. An odor filter as defined in claim 1, wherein the absorbent has a particle size that is at least three times smaller than a pore diameter of the substrate material.

28. An odor filter as defined in claim 1, wherein the absorbent has a mean particle diameter of 0.3 to 1 mm.

29. An odor filter as defined in claim 1, wherein 100 to 300 g/l of the absorbent is affixed to the substrate material, relative to the volume of the substrate material.

30. An odor filter as defined in claim 1, wherein the adhesive mass has a weight equal to that of the substrate material ±50%.

31. An odor filter as defined in claim 1, wherein the adhesive mass contains organic, cross-linkable polymers.

32. An odor filter as defined in claim 31, wherein the organic cross-linkable polymers are selected from the group consisting of derivatives of acrylic acid, polyurethane, polystyrene, polyisocynate and polyvinyl acetate.

33. An odor filter as defined in claim 1, wherein the adhesive mass includes a hot-melt adhesive.

34. An odor filter as defined in claim 31, wherein the adhesive mass includes a prepolymeric low-solvent two-component system based on at least one of masked diisocyanates and polyisocyanates, which are cross-linked to at least one of diamines and polyamines.

35. An odor filter as defined in claim 31, wherein the adhesive mass includes at least one of non-masked polymeric diisocyanates and polyisocyanates.

36. An odor filter as defined in claim 1, and further comprising a grease filter arranged ahead of the adsorption filter bed in a flow direction.

37. A combination comprising an exhauster hood and an odor filter, the odor filter comprising an adsorption filter bed regenerable by washing, said filter bed being formed of a highly air-permeable substrate material and an absorbent affixed thereto in an amount of 50 to 400 g/l by an adhesive mass and having a mean particle diameter between 0.2 and 2 mm, the adsorption filter being compressible and arranged in the exhauster hood under compression in a seal-free and frame-free manner.

38. A process for regenerating an odor filter for an exhauster hood, which odor filter includes an adsorption filter bed formed of a highly air permeable substrate material and an absorbent affixed thereto in an amount of 50 to 400 g/l by an adhesive mass, and having a mean particle diameter between 0.2 and 2 mm, the process comprising the step of regenerating the adsorption filter bed by washing.

39. A process as defined in claim 38, wherein the washing is carried in a dish washing machine.

40. A process as defined in claim 39, and further comprising the step of post-impregnating the adsorption filter bed with an acid after the washing step.

41. A process for filtering odors from air passing through a cooking exhauster hood, comprising the steps of: arranging an adsorption filter bed in the exhauster hood, the filter bed being made of a highly air permeable substrate material, an adsorbent having a mean particle diameter between 0.2 and 2 mm affixed to the substrate material in an amount of 50 to 400 g/l, and an adhesive mass which affixes the adsorbent to the substrate material; and regenerating the filter bed by removing the filter bed from the exhauster hood and washing the filter bed.

* * * * *